United States Patent
Le et al.

(10) Patent No.: US 9,213,545 B2
(45) Date of Patent: Dec. 15, 2015

(54) STORING DATA IN ANY OF A PLURALITY OF BUFFERS IN A MEMORY CONTROLLER

(75) Inventors: Hung Q. Le, Katy, TX (US); Theodore F. Emerson, Tomball, TX (US); David F. Heinrich, Tomball, TX (US); Robert L. Noonan, Crystal Lake, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 202 days.

(21) Appl. No.: 13/641,567

(22) PCT Filed: Jun. 22, 2010

(86) PCT No.: PCT/US2010/039477
§ 371 (c)(1),
(2), (4) Date: Oct. 16, 2012

(87) PCT Pub. No.: WO2011/149482
PCT Pub. Date: Dec. 1, 2011

(65) Prior Publication Data
US 2013/0046933 A1    Feb. 21, 2013

Related U.S. Application Data (60) Provisional application No. 61/349,584, filed on May 28, 2010.

(51) Int. Cl.
*G06F 12/00* (2006.01)
*G06F 12/08* (2006.01)
*G06F 9/06* (2006.01)
*G06F 13/16* (2006.01)

(52) U.S. Cl.
CPC . *G06F 9/06* (2013.01); *G06F 13/16* (2013.01)

(58) Field of Classification Search
CPC ........... G06F 12/00; G06F 12/08; G06F 9/06; G06F 13/16; G06F 13/1605; G06F 13/1668; G06F 13/18
USPC ......... 711/100, 118, 122, 133, 143, 144, 145, 711/149, E12.037, E12.051; 365/230.05, 365/189.05
See application file for complete search history.

(56) References Cited

U.S. PATENT DOCUMENTS

| | | | | |
|---|---|---|---|---|
| 5,546,543 A | * | 8/1996 | Yang | G06F 13/362 709/234 |
| 5,627,993 A | * | 5/1997 | Abato et al. | 711/143 |
| 6,014,722 A | * | 1/2000 | Rudin | G06F 13/364 370/447 |
| 6,092,158 A | | 7/2000 | Harriman et al. | |

(Continued)

FOREIGN PATENT DOCUMENTS

JP    1643482    7/2005

OTHER PUBLICATIONS

International Searching Authority, International Search Report and the Written Opinion, Jun. 9, 2011, 8 pages.

*Primary Examiner* — Mark Giardino, Jr.
*Assistant Examiner* — Kamal Dewan
(74) *Attorney, Agent, or Firm* — Conley Rose P.C.

(57) ABSTRACT

A memory controller containing one or more ports coupled to a buffer selection logic and a plurality of buffers. Each buffer is configured to store write data associated with a write request and each buffer is also coupled to the buffer selection logic. The buffer selection logic is configured to store write data associated with a write request from at least one of the ports in any of the buffers based on a priority of the buffers for each one of the ports.

15 Claims, 11 Drawing Sheets

(56) References Cited

U.S. PATENT DOCUMENTS

| | | |
|---|---|---|
| 6,622,218 B2 * | 9/2003 | Gharachorloo et al. ...... 711/141 |
| 6,681,292 B2 | 1/2004 | Creta et al. |
| 7,353,301 B2 | 4/2008 | Radhakrishnan et al. |
| 7,529,896 B2 | 5/2009 | Jeddeloh et al. |
| 7,538,772 B1 | 5/2009 | Fouladi et al. |
| 2001/0016894 A1 | 8/2001 | Pham |
| 2002/0087806 A1 | 7/2002 | Gharachorloo |
| 2002/0116586 A1 * | 8/2002 | Tremblay .............. G06F 12/084 711/143 |
| 2003/0120874 A1 * | 6/2003 | Deshpande et al. .......... 711/141 |
| 2003/0182517 A1 * | 9/2003 | Gooch .......................... 711/150 |
| 2005/0204093 A1 | 9/2005 | Rotithor et al. |
| 2007/0156946 A1 | 7/2007 | Lakshmanamurthy |
| 2008/0177929 A1 * | 7/2008 | Gower et al. ................. 711/100 |
| 2008/0198681 A1 * | 8/2008 | Kenkare et al. .......... 365/230.05 |
| 2009/0132761 A1 | 5/2009 | Yim et al. |
| 2010/0011145 A1 * | 1/2010 | Carver et al. ................. 710/310 |

* cited by examiner

Figure 4b

STORING DATA IN ANY OF A PLURALITY OF BUFFERS IN A MEMORY CONTROLLER

CROSS-REFERENCE TO RELATED APPLICATIONS

This application claims the benefit of provisional patent application Ser. No. 61/349,584, filed May 28, 2010, titled "Storing Data in any of a Plurality of Buffers in a Memory Controller."

BACKGROUND

A memory controller manages the flow of data being written to and read from a physical memory. A "read request" is a request to read data from memory and may comprise an address in memory to be read from and an identifier of the device desiring to read from memory. A "write request" is a request to write data to memory and may comprise the data to be written, the address in memory to write the data to, and an identifier of the device desiring to write to memory. Read requests and write requests from a particular device enter the memory controller by way of a port. A multi-port memory controller is a memory controller that is capable of servicing read requests and write requests from more than one device, where each device is assigned to a particular port of the memory controller.

Many different devices require access to physical memory for various reasons (e.g., storing pointers, data). To reduce cost, these devices may share a single physical memory, which can lead to many memory requests for the same resource. Not all memory requests can be fulfilled simultaneously, so write buffers are used to hold pending write data while other write data is written to memory. Each port has a dedicated write buffer, which allows write requests coming into a port to be absorbed without having to immediately write the associated write data to memory. Often, one port of a memory controller has a low demand for memory access while another port has a high demand for memory access, thus one buffer is not being utilized as frequently as another buffer.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
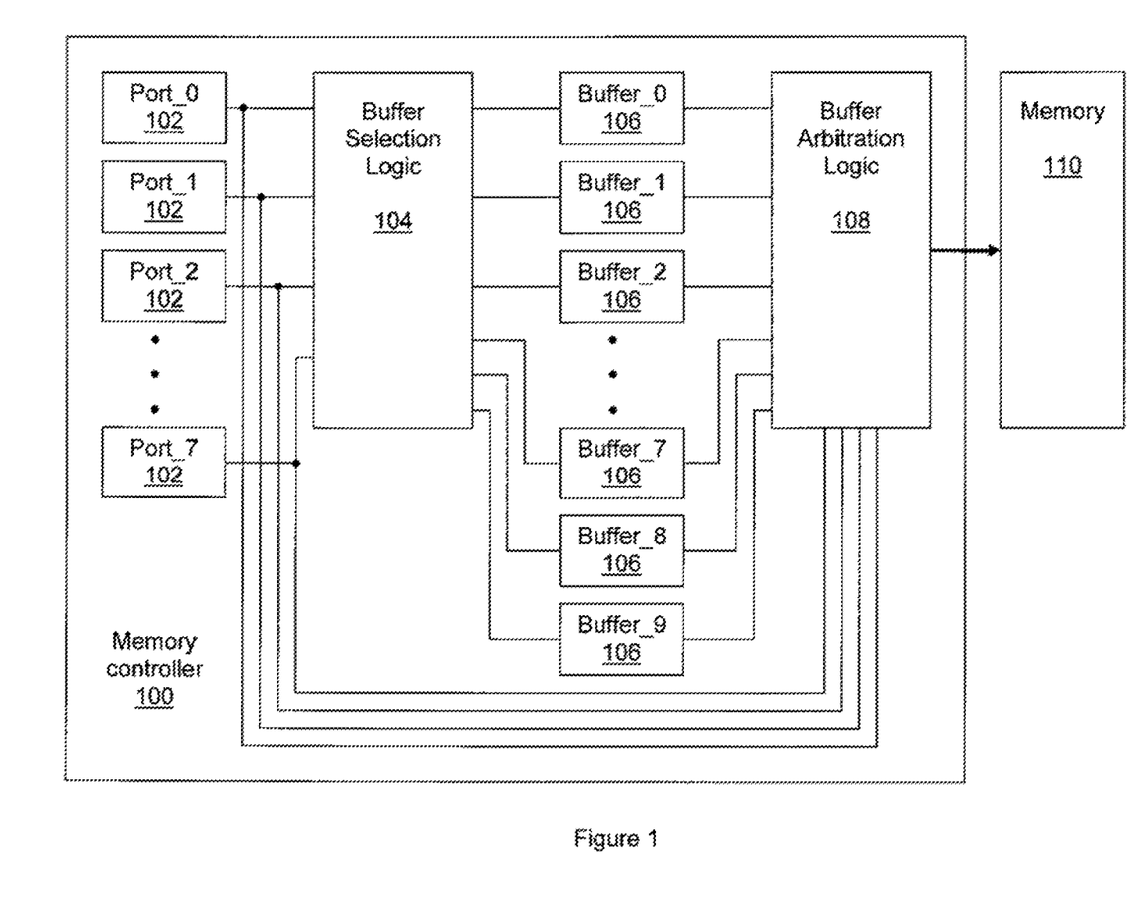
FIG. 1 shows a system block diagram in accordance with various embodiments.

In accordance with various embodiments, FIG. 1 shows a memory controller 100 that comprises ports 102 coupled to a buffer selection logic 104 and a buffer arbitration logic 108. Each port 102 receives read requests and write requests from a device (e.g., a processor, an input/output device, a video device). Additionally, the memory controller 100 comprises buffers 106 coupled to both the buffer selection logic 104 and the buffer arbitration logic 108. The buffers 106 are configured to temporarily store write data associated with a write request before such data is written to memory. In an exemplary embodiment, the buffers 106 are the size of a cache line (e.g., 32 bytes) and each stores write data for multiple addresses of a memory 110. Write requests are passed from the pod 102 to the buffer selection logic 104, whereas read requests are passed from the post 102 to the buffer arbitration logic 108. Each port 102 may present a write request to the buffer selection logic 104 during a given cycle, and thus multiple write requests may be presented to the buffer selection logic 104 during a given cycle. Additionally, the buffer arbitration logic 103 is coupled to the memory 110 (e.g., cache).

The buffer selection logic 104 receives write requests from the ports 102 during a given cycle and is aware of the status of each buffer 106. For example, the buffer selection logic 104 is aware of the originating port of write data in a buffer 106, the address in memory 110 that the write data in the buffer 106 corresponds to, and the address range (i.e., cache line) represented in the buffer 106. In an exemplary embodiment, the buffers 106 store 32 bytes of write data and an address in memory stores 2 bytes of data; thus, the buffers 106 each store 16 sequential addresses, which forms a cache line. The buffer selection logic 104 also associates each port 102 with a unique buffer, to which the particular port is given the highest priority. For example, port_0 gets the highest priority for buffer_0 and port_7 gets the highest priority for buffer_7. In an exemplary embodiment, port_0 gets progressively lower priorities as the buffer number increases (e.g., buffer_9 is the lowest priority buffer for port_0); port_7 is similar, however the buffers wrap around (e.g., 7, 8, 9, 0, 1, 2, 3, 4, 5, 6), and thus buffer_6 is the lowest priority buffer for port_7. As a result of this exemplary scheme, at each priority level, each port 102 is associated with only one buffer 106.

In another exemplary scheme, each buffer's 106 assignment priority changes every time write data is stored in the buffer 106. For example, buffer_0 gives the highest priority to port_0 initially, but after the write data from port_0 has been written to memory 110, buffer_0 gives the highest priority to port_1, and so forth. As a result, each buffer 106 gives a more evenly distributed priority to each port 102. In accordance with various embodiments, the priority scheme may be hard-coded into the buffer selection logic 104 circuitry, while in other embodiments the priority scheme may be programmable.

In accordance with various embodiments, the buffer selection logic 104 receives a write request from one or more ports 102 during a given cycle. In response to receiving a write request, the buffer selection logic 104 sends a request to all buffers 106 to determine the availability of the buffers 106. FIGS. 2a-f show illustrative port-buffer diagrams 200-250. For example, in FIG. 2a, the buffer selection logic 104 receives write requests from port_0, port_1, and port_2 (shown as bold boxes). Assume buffer_0 and buffer_2 are not available and all other buffers (i.e., 1 and 3-9) are available (available buffers shown as bold boxes). A buffer 106 may not be available if the buffer 106 contains write data that has not been written to memory 110, and thus represents the only available instance of such write data and cannot be overwritten. For each write request, the buffer selection logic 104 sends a request to all buffers 106, shown by the arrows in FIG. 2a.

If a buffer 106 is available, the buffer 106 returns an acknowledgement to the buffer selection logic 104 for the request originating from the buffer's highest priority port, which causes the buffer selection logic to grant the write request originating from each available buffer's highest priority port. Thus the buffer selection logic 104 receives an acknowledgement from buffer_1 for port_1, shown by the arrow in FIG. 2b from buffer_1 to port_1, because port_1 is the highest priority port 102 for buffer_1. The buffer selection logic 104 also receives an acknowledgement from each buffer_3-9 for port_2, shown by the other arrows in FIG. 2b, because port_2 has a higher priority for each of those buffers than port_1 or port_0. In this exemplary embodiment, port_2 has a higher priority over those buffers because they are "closer" to port_2 than port_0 (e.g., buffer_3 is second in the priority of port_2, whereas buffer_3 is third in the priority of port_1 and fourth in the priority of port_0, and so on). At this point, the buffer selection logic 104 has not received an acknowledgement from any buffer 106 for the write request of port_0, because there is a higher priority port (i.e., port_1 or port_2) for each available buffer.

Continuing the above example, for each port receiving an acknowledgement from the buffers 106, the buffer selection logic 104 grants the write request and stores the write data associated with the write request in that port's highest priority buffer 106. Thus, the write data from port_1 is stored in buffer_1 and the write data from port_2 is stored in buffer_3, shown by the arrows in FIG. 2c. Although buffer_4-9 also acknowledged their availability for the write request from port_2, these buffers are lower than buffer_3, which is second, in the priority of port_2. As explained above, the buffer selection logic 104 has not received an acknowledgement from any buffer 106 for the write request of port_0, and thus the write request from port_0 has not yet been granted and the write data associated with the write request from port_0 has not yet been stored to any buffer 106.

Figure 2A:
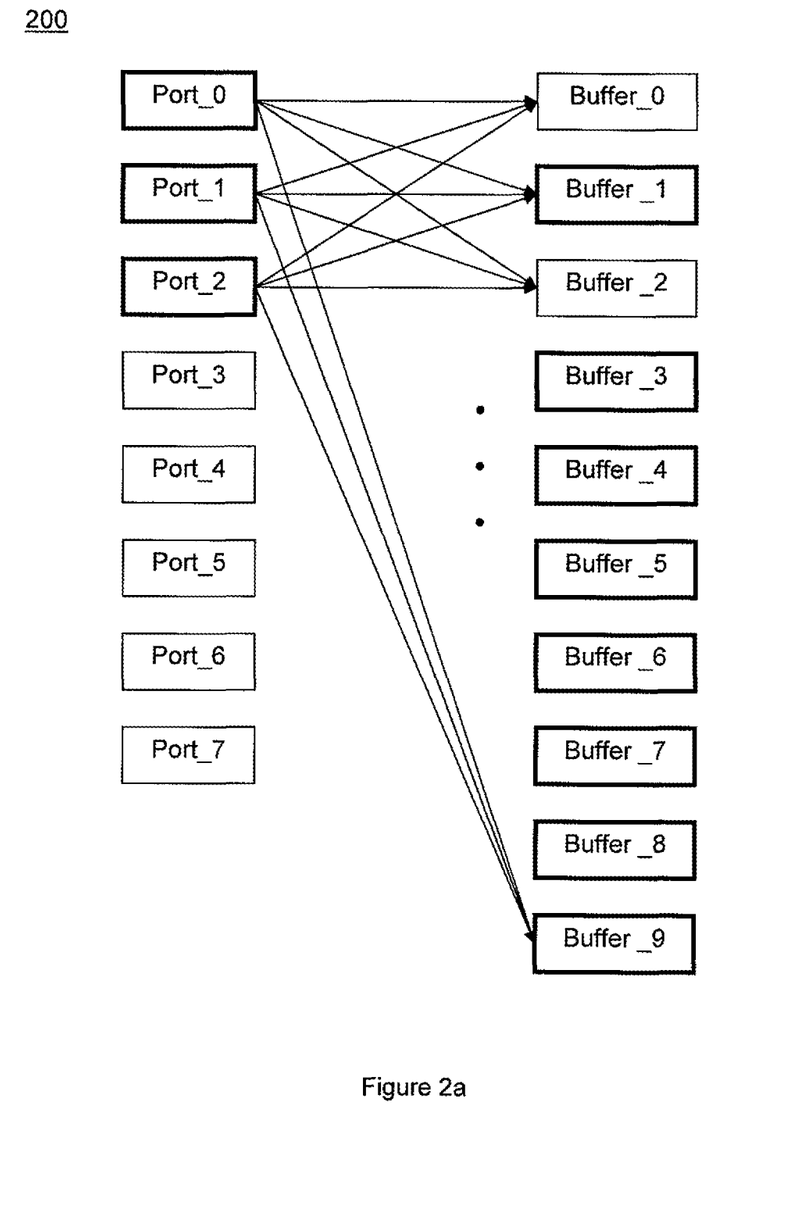
FIGS. 2a, 2b, 2c, 2d, 2e and 2f show exemplary port-buffer diagrams in accordance with various embodiments.
Figure 2B:
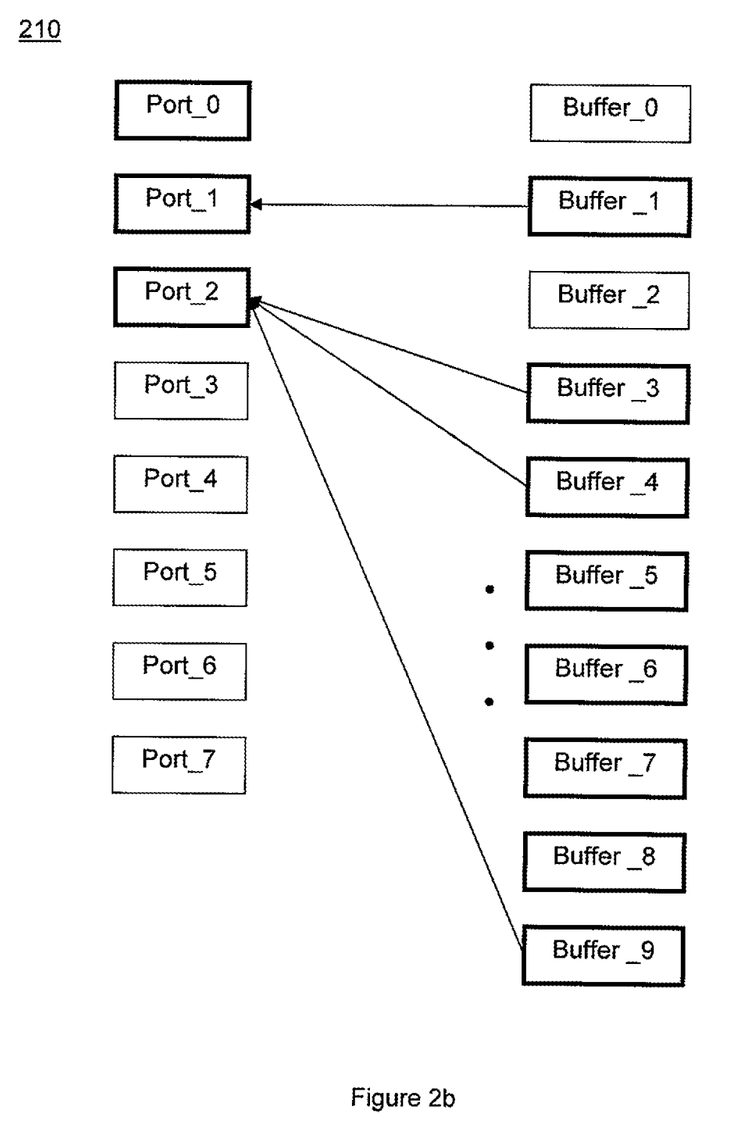
Figure 2C:
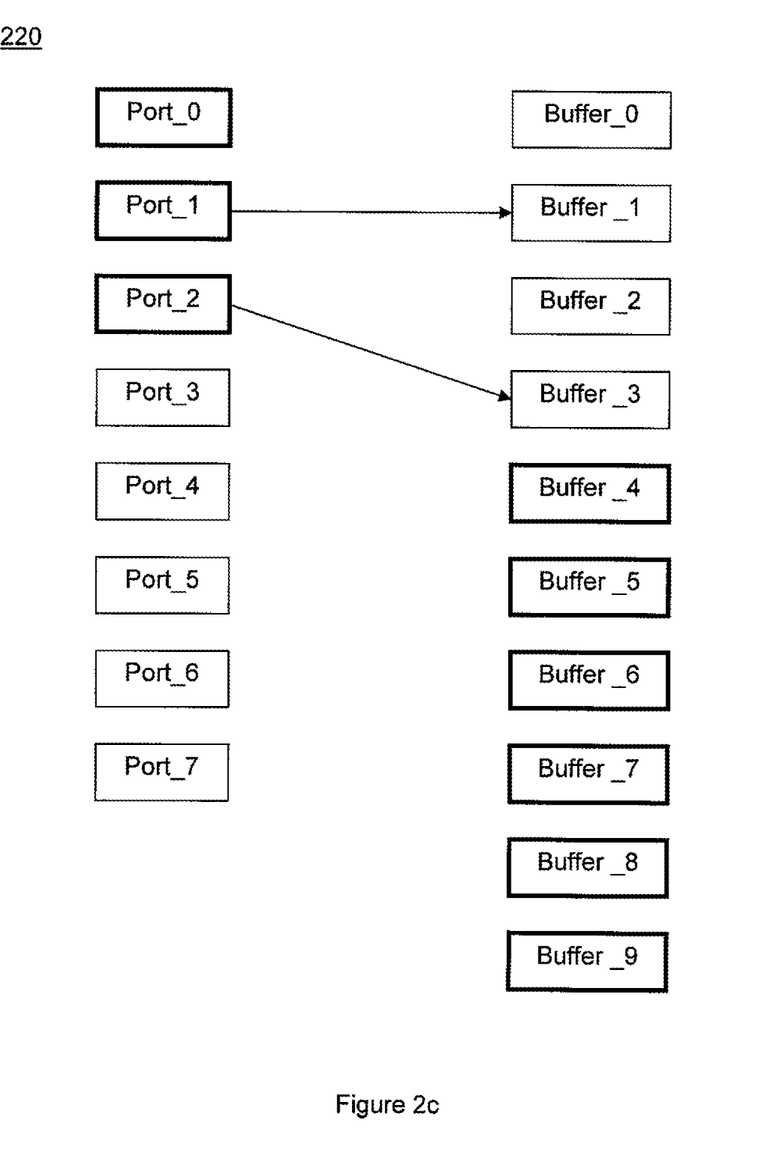
Figure 2D:
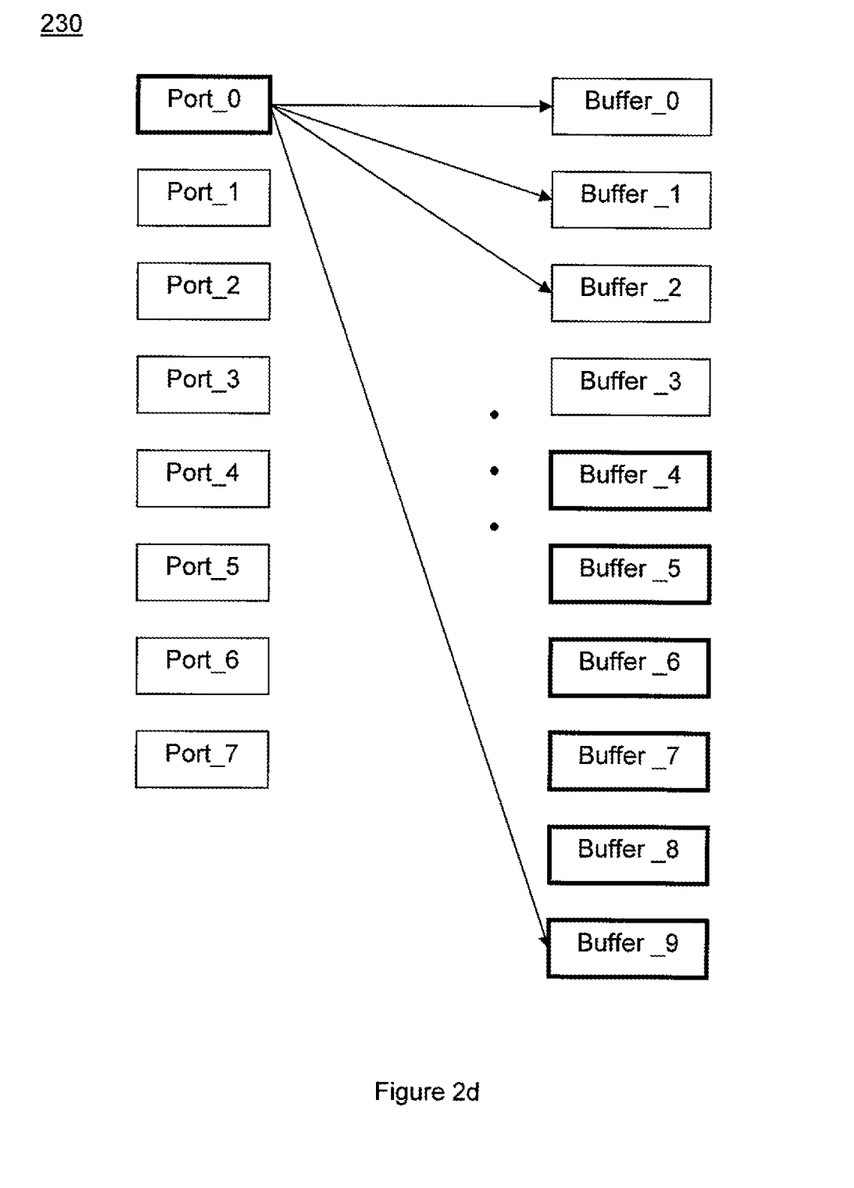
Figure 2E:
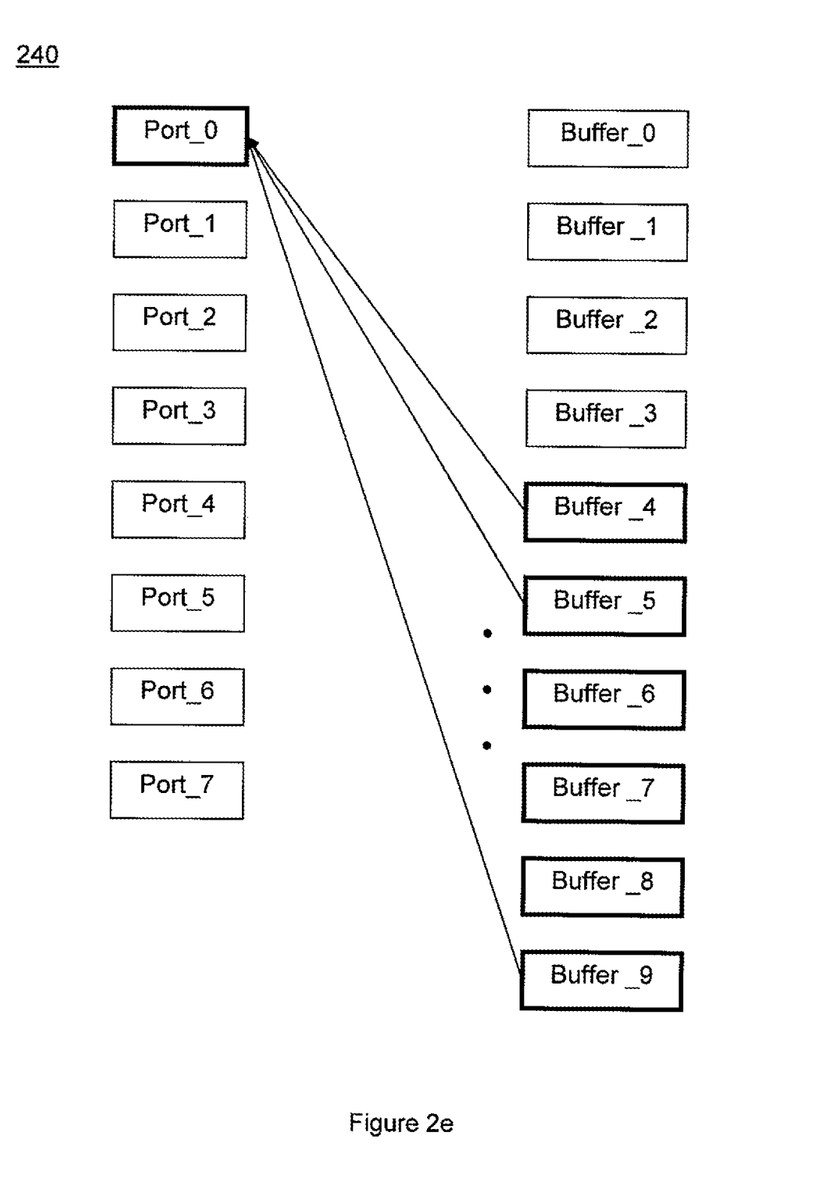
Figure 2F:
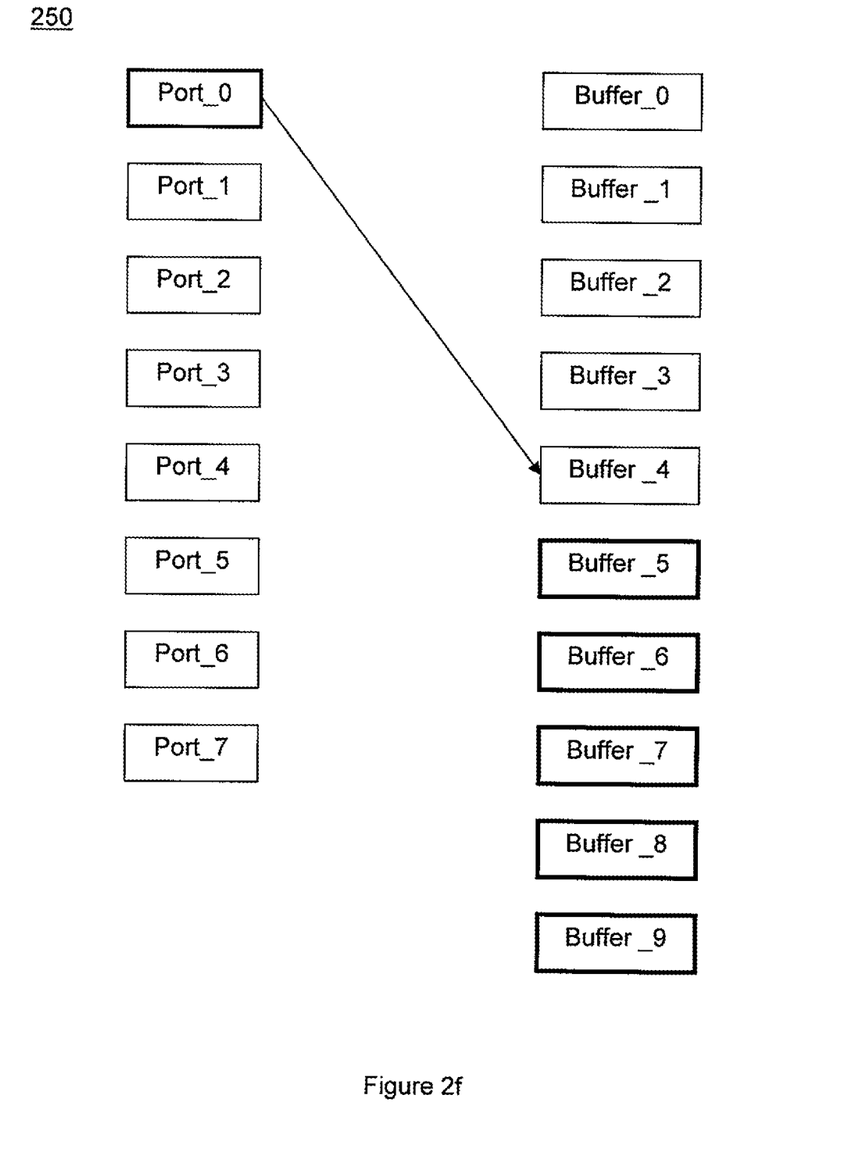

In the following cycle, the buffer selection logic 104 again receives a write request from port_0. In some embodiments, port_0 reasserts its write request during the following cycle; alternatively, port_0 maintains its write request and does not need to specifically de-assert and retry the write request during the following cycle. FIG. 2d shows an illustrative port-buffer diagram 230. Port_1 and port_2 are no longer bolded, as write data associated with their write requests has been stored by the buffer selection logic 104 to buffer_1 and buffer_3, respectively. Buffer_1 and buffer_3 are no longer bolded because they contain the write data associated with the write requests from port_1 and port_2 from the previous cycle and are no longer available for storing additional write data.

As above, in response to receiving the write request from port_0, the buffer selection logic 104 sends a request to all buffers 106 to determine the availability of the buffers 106, shown by the arrows in FIG. 2d. As above, if a buffer 106 is available, the buffer 106 returns an acknowledgement to the buffer selection logic 104 for the request originating from the buffer's highest priority port. Thus the buffer selection logic 104 receives an acknowledgement from each buffer_4-9 for port_0, shown by the arrows in FIG. 2e, because port_0 is the highest priority remaining port for each of those buffers. For each port receiving an acknowledgment from the buffers 106 (only port_0, at this point), the buffer selection logic 104 grants the write request and stores the write data associated with the write request from port_0 to buffer_4, shown by the arrow in FIG. 2f, because buffer_4 is the highest priority buffer for port_0 that granted the write request from port_0. Although buffer_5-9 also acknowledged their availability for the write request from port_0, these buffers are lower than buffer_4 in the priority of port_0. Furthermore, in an alternate embodiment, the write request from port_0 is handled using the scheme described above, but during the same cycle as the write requests from port_1 and port_2.

The buffer selection logic 104 is described as a centralized logic unit that receives write requests from the ports 102, sends a request to the buffers 106 to determine the availability of the buffers 106, receives acknowledgements of availability from the buffers 106, and stores write data associated with the write requests from the ports 102 to the appropriate buffer 106. However, one skilled in the art would understand that such logic implementation could exist in a decentralized fashion. For example, the pods 102 could communicate directly with the buffers 106. The requests from the ports 102 to determine buffer availability may comprise information such as the addresses associated with the write data of the write request and other information necessary to determine whether a buffer 106 is available. The buffers 106 are configured to receive such requests from the ports 102 and determine whether to acknowledge the request. As above, each buffer 106, if available, only acknowledges the request that originates from the highest priority port 102 of the buffer 106. Then each port 102 receiving an acknowledgement from one or more buffers 106 stores the write data associated with its write request to the highest priority buffer 106 that acknowledged its request.

In practice it may be rare for all buffers to be unavailable during a given cycle; this is particularly true when the memory controller 100 is designed with a greater number of buffers 106 than ports 102. Thus, in a majority of cases, the write data associated with an incoming write request is able to be stored in a buffer 106 without having to wait for the write data of some buffer to be sent to memory 110. If all buffers are unavailable for the incoming write request, then the write request must wait for the next cycle to attempt to access one of the buffers 106. Factors for determining availability of buffers are explained in further detail below.

In accordance with various embodiments, a buffer 106 is available if it is empty, or has been previously written to the memory 110, which can be ascertained by checking a busy bit associated with the buffer 106. The busy bit for each buffer 106 is used to denote that the buffer 106 already contains write data so that only the original granted port 102 can continue to write to this buffer 106. If the busy bit is de-asserted, the buffer 106 is empty. The busy bit is de-asserted when the contents of a buffer 106 are transferred to memory 110.

In accordance with various embodiments, the buffer selection logic 104 is configured to merge write data associated with a current write request and write data associated with a prior write request stored in a buffer 106 if the data of the current write request is associated with the same cache line as the write data stored in the buffer 106. If the conditions for merging write data associated with a current write request and write data associated with a prior write request stored in a buffer 106 are met, that buffer 106 is available for that particular write request.

Figure 3A:
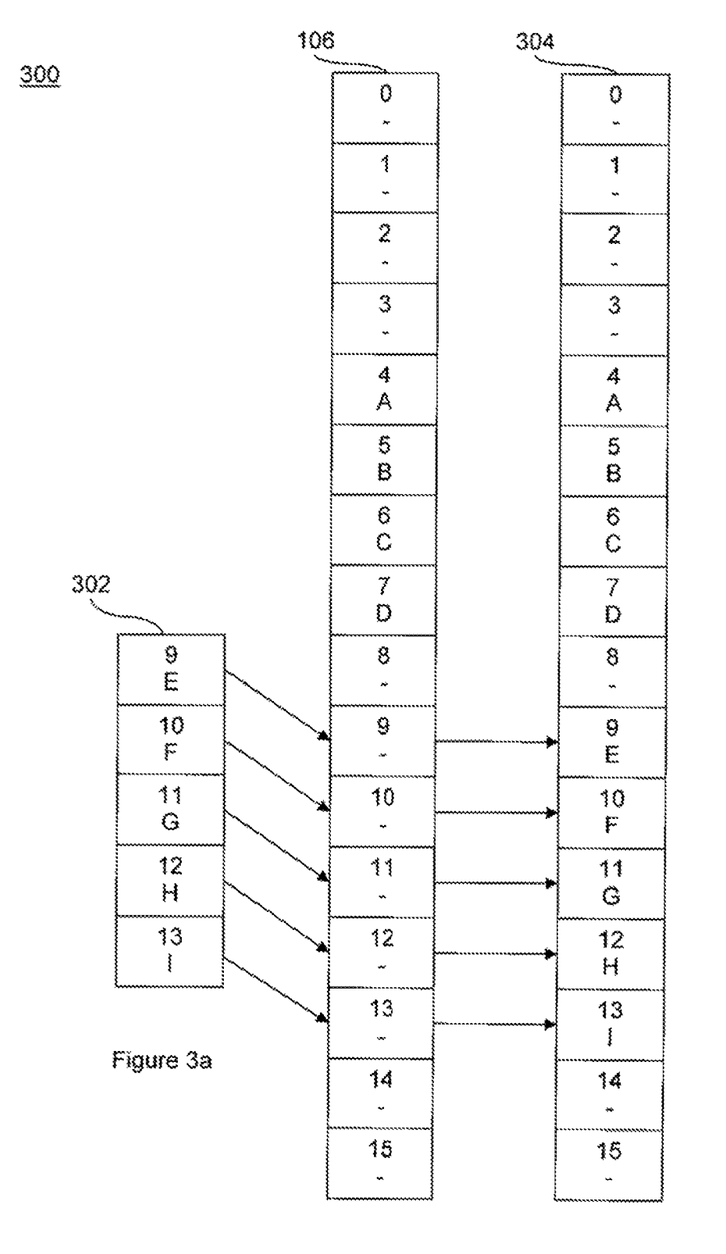
FIGS. 3a and 3b show exemplary memory diagrams in accordance with various embodiments.

FIG. 3a shows an illustrative diagram of the merging process 300. For example, if a buffer 106 is 32 bytes in size and an address represents 2 bytes in memory, then the buffer 106 comprises 16 address locations (e.g., addresses 0-15). If the prior write request involved writing data "A"-"D" to addresses 4-7, respectively, then "A"-"D" are stored in locations 4-7 of buffer_0. The current write request 302 contains write data "E"-"I" for addresses 9-13, respectively (i.e., addresses in the same cache line as the prior write request), the contents of the buffer 106 do not need to be written to memory 110 nor does the current write request need to get its own buffer. The resulting contents 304 of the buffer 106 include data for addresses 4-7 from the prior write request and data for addresses 9-13 from the current write request 302.

Figure 3B:
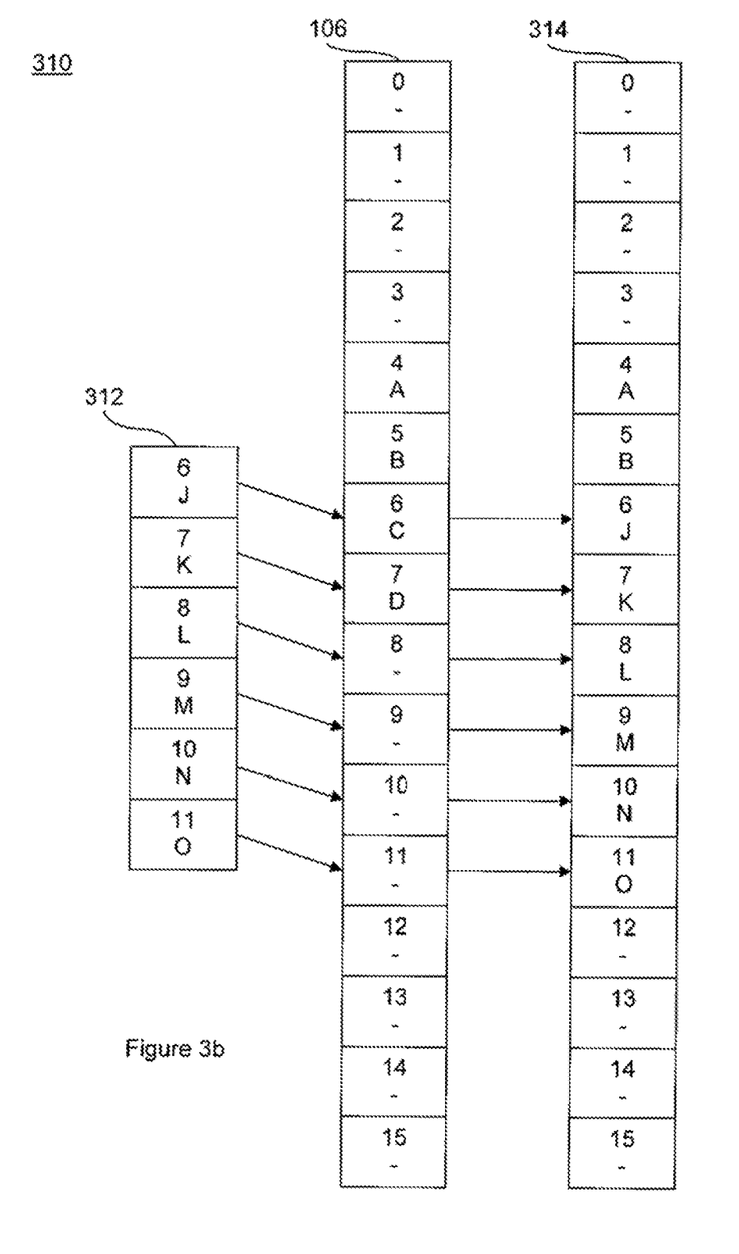

Alternatively, because only the most recent data written to an address has meaning for a subsequent read request, write data to overlapping addresses within a cache line may also be merged. FIG. 3b shows another illustrative diagram of the merging process 310. For example, if the prior write request involved writing data "A"-"D" to addresses 4-7, respectively then "A"-"D" are stored in locations 4-7 of a buffer 106. The current write request 312 contains write data "J"-"O" for addresses 6-11, the respectively. The resulting contents 314 of the buffer 106 include data for addresses 4-5 from the prior write request and data for addresses 6-11 from the current write request 312. Addresses 6-7 of the prior write data have been overwritten.

However, the buffer 106 still appears to be unavailable to other ports because merging has not caused the write data stored in buffer 106 to be written to memory 110 and thus the busy bit of the buffer 106 is asserted. As a result, the buffer 106 is not available if the incoming write request is for a different address or group of addresses than the addresses of the cache line represented by write data stored in the buffer 106 (i.e., addresses other than 0-15) and the busy bit of the buffer 106 remains asserted.

In accordance with various embodiments, the busy bit is de-asserted when the write data stored in a buffer 106 is written to a memory 110. The buffer arbitration logic 108 receives read requests from the ports 102 during a given read cycle and is aware of the status of each buffer 106. For example, the buffer arbitration logic 108 is aware of the originating port of write data in a buffer 106 and the address in memory 110 that the write data in a buffer 106 corresponds to. Using this information, the buffer arbitration logic 108 determines when to write the contents of a buffer 106 to memory 110. In some cases, the buffer arbitration logic 108 may determine that, during a given cycle, the contents of more than one buffer 106 should be written to memory 110. However, depending on the size of the bus to memory 110, in some embodiments the contents of only one buffer 106 may be written to memory 110 per cycle, thus the buffer arbitration logic 108 determines which buffer 106 will have its contents written to memory 110.

The buffer arbitration logic 108 determines to write the contents of a buffer 106 to memory 110 based on the occurrence of different events. A write/write coherence hit occurs when a write request originates from a different port 102 and corresponds to the same cache line than write data from a port 102 stored in a buffer 106. For example, if write data associated with a write request from port_1 corresponds to addresses 0-15, and port_0 has write data stored in a buffer 106 that corresponds to addresses 0-15 (i.e., the same cache line that the write request from port_1 corresponds to), there has been a write/write coherence hit, in an exemplary embodiment, a write/write coherence hit causes the buffer arbitration logic 108 to write the contents of the buffer 106 storing write data associated with the earlier write request to memory 110 and to de-assert the busy bit for that buffer 106. Thus, when a write request to the same cache line originates from a different port 102, write data associated with the write request may be stored in a buffer 106 if one is available and the contents of the buffer 106 storing write data associated with the earlier write request will be written to memory 110. This helps to ensure that incoming write requests do not have to wait for their port's highest priority buffer 106 to empty before they can be stored to a buffer 106 while also ensuring that one port will not consume too many buffers 106 as a result of sequential wife requests to different cache lines in memory 110. In an alternate embodiment, a deeper write/write coherence hit threshold is set (e.g., the second write/write coherence hit, or third write request to a different cache line, rather than the first coherence hit causes the buffer containing write data associated with the earliest write request to be written to memory 110).

The buffer arbitration logic 108 also determines to write the contents of a buffer 106 if a read/write coherence hit occurs. A read/write coherence hit occurs when a read request is for the same cache line as is stored in a buffer 106. If the read request were serviced before the buffer 106 contents were sent to memory 110, the read request would access incorrect data from memory 110; thus, the write data in the buffer 106 must be sent to memory 110 before the read request is serviced, so that the read request reads from the "correct" version of memory 110 (i.e., so that memory 110 contains the data most recently written to the cache line). In an alternate embodiment, the buffer arbitration logic 108 returns the requested write data from the buffer 106 directly to the port 102 in response to a read request for a particular address or addresses, provided that the buffer 106 contains all of the write data requested by the read request. This avoids having to send the write data first to memory 110 and then subsequently read the write data from memory 110. However, if the buffer 106 does not contain all of the write data requested by the read request, the write data in the buffer 106 must be written to memory 110 first.

Additionally, if no read/write coherence hit occurs, the buffer arbitration logic 108 services the read request without writing any of the buffers 106 to memory 110. In such a situation, the read request avoids waiting for any data to be written to memory before it accesses memory 110 and all write data in the buffers 106 remains in the buffers 106 and valid.

In accordance with various embodiments, the buffer arbitration logic 108 is configured to monitor a valid bit associated with each buffer 106. The valid bit of a buffer 106 is asserted if it is determined that the write buffer needs to be written to the memory, for example, for the reasons given above. The assertion of the valid bit of the buffer 106 signifies to the buffer arbitration logic 108 that the buffer needs to participate in the arbitration for the memory 110. After the write data of the buffer 106 is written to the memory 110, the valid bit is de-asserted.

Additionally, the buffer 106 maintains a status bit for each byte in the cache line (i.e., two status bits per address in the case of a 2-byte address size). The status bit indicates whether a particular byte in the cache fine contains valid data that has not been written to the memory 110. In this way, only bytes that have been modified in the cache line are actually written back to the memory 110 when if is determined that a buffer 106 needs to be written to the memory 110. The first write request to an empty buffer 106 will cause the status bit to be asserted for each byte that is written to the buffer 106.

Referring back to FIG. 3a, the status bits for addresses 4-7 (i.e., the addresses containing valid data not yet written to the memory 110) are asserted. The status bits for addresses 0-3 and 0-15 are de-asserted because these addresses contain invalid data or have previously been written to the memory 110. A subsequent write request that is merged in a buffer 106 updates the associated status bits such that when the write data of the buffer 106 are eventually written to the memory 110, the status bits associated with the valid addresses are asserted. For example, the resulting contents 304 of the buffer 106 demonstrate that the status bits for addresses 4-7 and 9-13 are asserted because these addresses contain valid data that has not been written to the memory 110. The status bits for addresses 0-3, 8 and 14-15 are de-asserted because these addresses contain invalid data or have previously been written to memory 110. After the write data of the buffer 106 is written to the memory 110, all of the status bits are de-asserted.

The buffer arbitration logic 108 also de-asserts the busy bit for a buffer 106 after writing the contents of that buffer 106 to memory 110. However, if the requested write data is returned directly to the port 102, the buffer arbitration logic 108 does not de-assert the busy bit because another read request may access the same cache line, and the buffer 106 contents have not been written to memory 110, thus the buffer 106 is not empty.

The above discussion addresses the scenarios in which only one port 102 generates a write/write coherence hit or a read/write coherence hit. However, one skilled in the art would understand that, because of the nature of multi-port memory controllers, more than one port 102 could generate a coherence hit in a given cycle. In accordance with various embodiments, the buffer arbitration logic 108 thus determines which port 102 accesses memory 110 in the given cycle. This could be based on a priority of the port 102, where port_0 has the highest priority and port_7 has the lowest priority, or any other suitable method to arbitrate between competing ports 102.

Figure 4A:
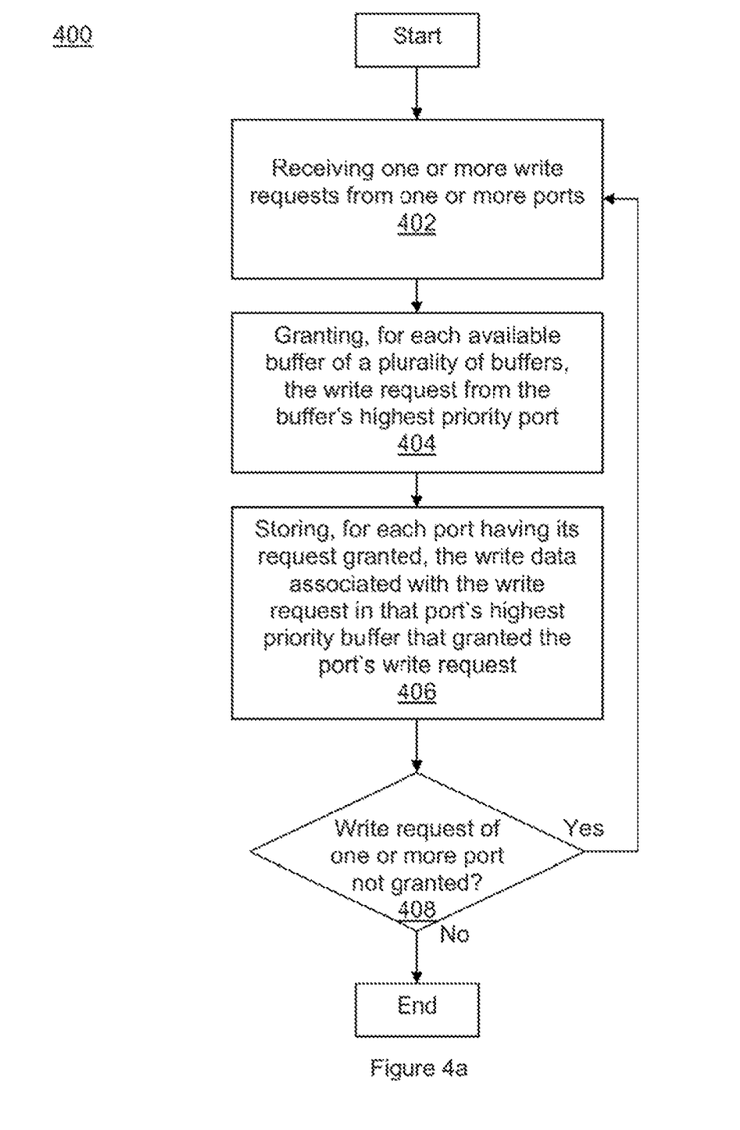
FIG. 4a shows a method flow chart in accordance with various embodiments.

FIG. 4a shows a method 400 in accordance with various embodiments. The method begins with receiving one or more write requests from one or more ports 102 (block 402). In an exemplary embodiment the buffer selection logic 104 receives the one or more write requests. However, as discussed above, the buffer selection logic 104 may be implemented in a decentralized fashion, where a port 102 sends a write request to each buffer 106 and thus each buffer 106 receives one or more write requests.

The method 400 continues with granting the write request originating from each buffer's 106 highest priority port 102 (block 404). If a buffer 106 is available, the buffer 106 returns an acknowledgement to the buffer selection logic 104 for the request originating from the buffer's highest priority port, which causes the buffer selection logic to grant the write request originating from each available buffer's highest priority port. For example, as discussed above with respect to FIGS. 2a and 2b, each buffer_3-9 acknowledges the write request of port_2 rather than port_0 because, in this exemplary scheme, port_2 is a higher priority port for each of those buffers. Additionally, port_1 is the highest priority port for buffer_1, and thus buffer_1 acknowledges the write request from port_1. However, implementing the buffer selection logic 104 in a decentralized fashion, each available buffer 106 acknowledges the write request from the buffer's highest priority port 102 directly to that port 102.

For each port 102 having its write request granted, the method 400 continues with storing the write data associated with the write request in the port's 102 highest priority buffer 106 that granted the port's 102 write request (block 406). For example, write data associated with the write request from port_1 is stored in buffer_1, because buffer_1 is the highest priority buffer that acknowledged the write request from port_1. Likewise, write data associated with the write request from port_2 is stored in buffer_3, because buffer_3 is the highest priority buffer that acknowledged the write request from port_2. In accordance with various embodiments, the buffer selection logic 104 stores the write data to the highest priority buffer 106 for a port 102. Alternatively, the buffer selection logic 104 is implemented in a decentralized fashion and a port 102, upon receiving one or more grants from the buffers 106, stores the write data associated with the write request from that port 102 to the highest priority buffer 106 that granted the port's 102 write request.

If there are one or more ports 102 that did not have their write request granted (decision block 408), the method 400 reverts back to block 402. If all write requests from the ports 102 were granted (decision block 408), the method 400 ends. As above, the buffer selection logic 104 may determine whether there are write requests that have not been granted. Alternatively, a port 102 that did not have its write request granted reasserts the write request to each buffer 106 during the next cycle, and the method 400 proceeds in a decentralized fashion as described above.

Figure 4B:
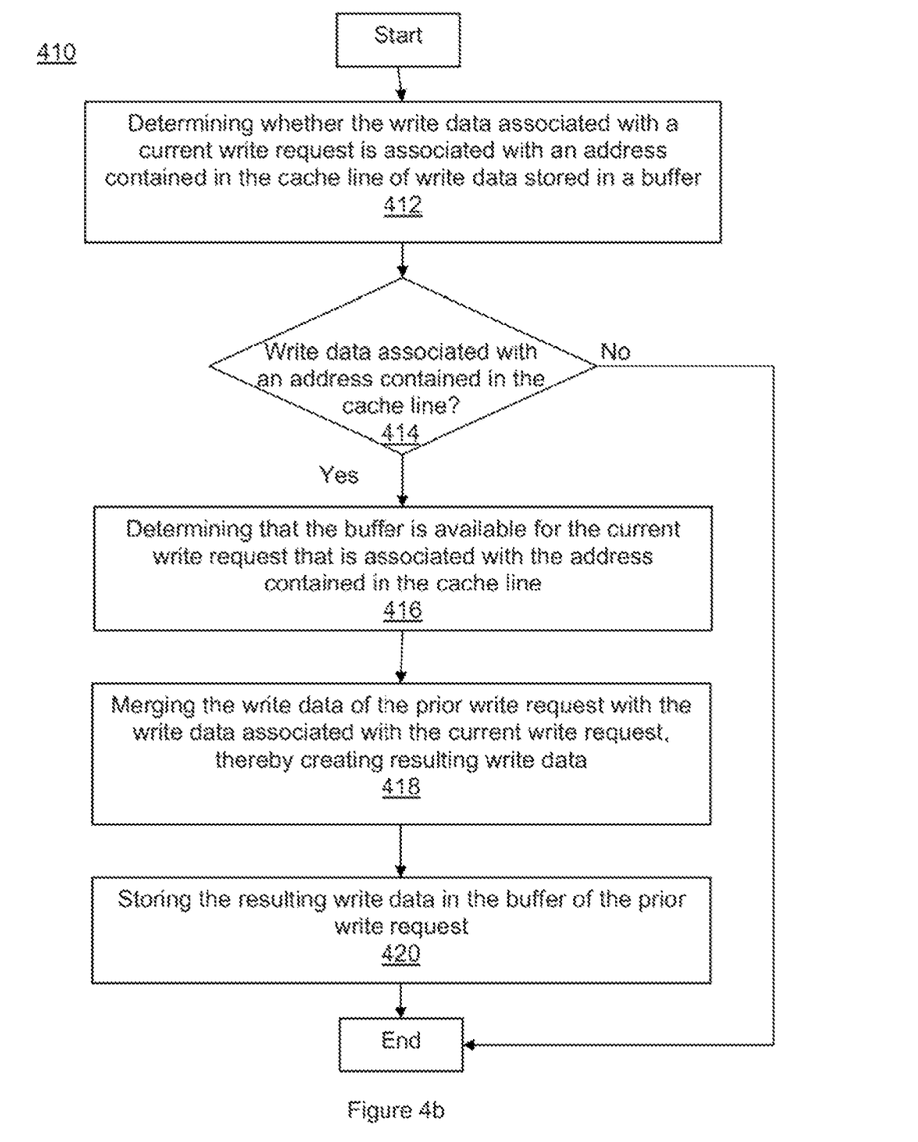
FIG. 4b shows another method flow chart in accordance with various embodiments.

FIG. 4b shows a method 410 for merging write data of a current write request with write data already stored in a buffer 106. The method 410 is a further explanation of the granting step of block 404 and the storing step of block 408 of the method 400. The method 410 begins with determining whether the write data associated with a current write request is associated with an address contained in the cache line of write data stored in a buffer 106 (block 412). As explained above, a buffer 106 contains, for example, 16 address locations. If the address of the write data associated with the current write request is included in the cache line (i.e., 16 address locations of a buffer 106) (decision block 414), then the method 410 continues with determining that the buffer 106 is available for the current write request (block 418). However, if the address of the write data associated with the current write request is not included in the cache line of a buffer 106 (decision block 414) then the method 410 ends. One skilled in the art would understand that the buffer 106 could still be available for the current write request if, for example, the busy bit of the buffer 106 is de-asserted.

If the buffer 106 is available for the current write request, the method 410 continues with merging the write data of the prior write request and the write data associated with the current write request, thereby creating resulting write data (block 418). Referring back to FIG. 3a, for example, if the prior write request involved writing data "A"-"D" to addresses 4-7. respectively, then "A"-"D" are stored in locations 4-7 of buffer_0. The current write request 302 contains write data "E"-"I" for addresses 9-13, respectively (i.e., addresses in the same cache line as the prior write request), the contents of buffer_0 do not need to be written to memory 110 nor does the current write request need to get its own buffer. The resulting contents 304 of buffer_0 include data for addresses 4-7 from the prior write request and data for addresses 9-13 from the current write request 302.

Alternatively, because only the most recent data written has meaning for a subsequent read request, write data to overlapping addresses within a cache line may also be merged. Referring back to FIG. 3b, for example, if the prior write request involved writing data "A"-"D" to addresses 4-7, respectively then "A"-"D" are stored in locations 4-7 of buffer_0. The current write request 312 contains write data "J"-"O" for addresses 6-11, respectively. The resulting contents 314 of buffer_0 include data for addresses 4-5 from the prior write request and data for addresses 6-11 from the current write request 312. Addresses 6-7 of the prior write data have been overwritten.

The method 410 continues with storing the resulting write data (304 or 314 from above) in the buffer 106 (buffer_0 in this case) of the prior write request (block 420) and the method 410 ends.

The above discussion is meant to be illustrative of the principles and various embodiments of the present invention. Numerous variations and modifications will become apparent to those skilled in the art once the above disclosure is fully appreciated. For example, although addresses in memory are described as being two bytes in size, addresses could be smaller or larger in size (e.g., one-byte addresses, four-byte addresses). It is intended that the following claims be interpreted to embrace all such variations and modifications.

What is claimed is:

1. A memory controller comprising:
a port to receive data;
a plurality of buffers; and
a buffer selection logic coupled to the port and the plurality of buffers, wherein the buffer selection logic is to:
assign different priority levels to the plurality of buffers in association with the port;
receive a request to store the data received at the port;
send the request for storage of the data to each of the plurality of buffers;
receive an acknowledgement of the request from buffers of the plurality of buffers that are available to store the data, and
select one of the available buffers to store the data based on the priority levels of the available buffers in association with the port.

2. The memory controller of claim 1, wherein, to select one of the available buffers to store the data, the buffer selection logic is to select one of the available buffers that has a highest priority level in association with the port.

3. The memory controller of claim 1, wherein one of the plurality of buffers is available if the buffer is empty.

4. The memory controller of claim 1, wherein:
one of the plurality of buffers stores write data associated with a prior write request, wherein the write data is associated with one or more addresses in a cache line;
the port is to receive new write data associated with an address; and
the buffer selection logic is to determine that the buffer storing the write data is available to store the new write data if the address of the new write data is in the cache line.

5. The memory controller of claim 4, wherein the buffer selection logic is further to merge the write data associated with the prior write request and the new write data and store the merged write data in the buffer containing the write data associated with the prior write request.

6. The memory controller of claim 1, further comprising a buffer arbitration logic coupled to the plurality of buffers, wherein the buffer arbitration logic is to:
receive a read request from the port;
determine whether the read request hits data stored in one of the plurality of buffers; and
send contents of the buffer that contains the data that the read request hits to a memory.

7. The memory controller of claim 1 further comprising a buffer arbitration logic coupled to the plurality of buffers, wherein the buffer arbitration logic is to:
receive a read request from the port;
determine whether the read request hits data stored in one of the buffers; and
return the data that the read request hits to the port.

8. The memory controller of claim 1 further comprising a buffer arbitration logic coupled to the plurality of buffers, wherein the buffer arbitration logic is to:
receive a write request from the port;
determine whether the write request hits data stored in one of the buffers;
send contents of the buffer that contains the data that the write request hits to a memory.

9. A method for controlling a plurality of buffers in a controller comprising a port to receive data and a buffer selection logic to select one of the plurality of buffers to store the data, the method comprising:
assigning, by the buffer selection logic, different priority levels to the plurality of buffers in association with the port;
receiving, at the buffer selection logic, a request to store data received at the port;
sending, by the buffer selection logic, the request to each of the plurality of buffers;
receiving, by the buffer selection logic, an acknowledgement of the request from buffers of the plurality of buffers that are available to store the data; and
selecting one of the available buffers to store the data based on the priority levels of the available buffers in association with the port.

10. The method of claim 9, wherein selecting one of the available buffers to store the data includes selecting one of the available buffers that has a highest priority level in association with the port.

11. The method of claim 9, further comprising:
receiving new write data at the port;
determining, by the buffer selection logic, whether the new write data is associated with an address contained in a cache line of previous write data stored in one of the plurality of buffers; and
determining that the buffer is available to store the new write data in response to a determination that the new write data is associated with the address contained in the cache line.

12. The method of claim 11 further comprising:
merging, as a result of the new write data being associated with the address contained in the cache line, the previous write data and the new write data thereby creating resulting write data; and
storing the resulting write data in the buffer containing the previous write data.

13. The method of claim 9, further comprising:
receiving a read request from the port;
determining whether the read request hits data stored in one of the buffers;
sending, as a result of the read request hitting the data in one of the buffers, contents of that buffer to a memory.

14. The method of claim 9, further comprising:
receiving a read request from the port;
determining whether the read request hits data stored in one of the buffers; and
returning, as a result of the read request hitting the data, the data to the port.

15. The method of claim 9, further comprising:
receiving write requests at the port;
determining whether one of the write requests hits data stored in one of the buffers; and
sending, as a result of the write request hitting the data in one of the buffers, contents of that buffer to a memory.

* * * * *